United States Patent
Meess et al.

(10) Patent No.: US 10,092,972 B2
(45) Date of Patent: Oct. 9, 2018

(54) WELDING DIFFUSER INSERT

(71) Applicant: Lincoln Global, Inc., City of Industry, CA (US)

(72) Inventors: Brian Meess, Willoughby, OH (US); Jeffrey Kachline, Highland Heights, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 0 days.

(21) Appl. No.: 14/885,747

(22) Filed: Oct. 16, 2015

(65) Prior Publication Data

US 2016/0039037 A1    Feb. 11, 2016

Related U.S. Application Data (63) Continuation of application No. 13/832,212, filed on Mar. 15, 2013.

(51) Int. Cl.
*B23K 9/28* (2006.01)
*B23K 9/29* (2006.01)
*B23K 9/26* (2006.01)

(52) U.S. Cl.
CPC ............... *B23K 9/295* (2013.01); *B23K 9/26* (2013.01)

(58) Field of Classification Search
CPC .......... B23K 9/26; B23K 9/295; B23K 9/325; B23K 9/291; B23K 9/29; B23K 9/293; B23K 9/296; B23K 9/203
USPC .... 219/137.42, 136, 137.31, 137.61, 137.71, 219/137.44
See application file for complete search history.

(56) References Cited

U.S. PATENT DOCUMENTS

| | | | | |
|---|---|---|---|---|
| 3,514,570 A | * | 5/1970 | Bernard | B23K 9/123 219/137.42 |
| 3,878,354 A | | 4/1975 | Frantzreb | |
| 4,158,763 A | | 6/1979 | Moerke | |
| 4,297,561 A | | 10/1981 | Townsend et al. | |
| 4,313,046 A | | 1/1982 | Henry et al. | |
| 4,529,863 A | * | 7/1985 | Lebel | B23K 9/173 219/137.2 |
| 4,572,942 A | * | 2/1986 | Church | B23K 35/383 219/121.5 |

(Continued)

FOREIGN PATENT DOCUMENTS

| | | | | |
|---|---|---|---|---|
| DE | 8916093 U1 | * | 10/1993 | B23K 9/295 |
| DE | 10341492 B4 | * | 4/2006 | B23K 9/295 |

*Primary Examiner* — Tu B Hoang
*Assistant Examiner* — Diallo I Duniver
(74) *Attorney, Agent, or Firm* — Perkins Coie LLP (57) ABSTRACT

A diffuser insert is provided for use with a welding diffuser and contact tip assembly comprising a diffuser with an interior chamber configured to receive a wire conduit that supplies electrode wire and a shielding gas used during a welding operation and a contact tip coupled to the diffuser and configured to receive electrode wire. The diffuser insert comprises a diffuser insert body configured to be disposed within the interior chamber of the diffuser, and further comprises an insert bore extending therethrough configured to receive electrode wire. An outer periphery of the diffuser insert has at least one surface feature configured to manipulate a flow of said shielding gas from within said interior chamber of the diffuser and out of exit passages to thereby direct said flow of shielding gas about a molten welding puddle formed during a welding operation.

19 Claims, 6 Drawing Sheets

(56) References Cited

U.S. PATENT DOCUMENTS

| | | | |
|---|---|---|---|
| 4,645,901 A | | 2/1987 | Scholz et al. |
| 4,675,493 A | * | 6/1987 | Gartland .............. H05H 1/3405 |
| | | | 219/136 |
| 4,769,521 A | | 9/1988 | Sugiyama |
| 4,866,246 A | * | 9/1989 | Church .................. B23K 9/173 |
| | | | 219/136 |
| 5,440,100 A | | 8/1995 | Stuart et al. |
| 5,556,562 A | * | 9/1996 | Sorenson ................ B23K 9/295 |
| | | | 219/137.61 |
| 5,721,417 A | | 2/1998 | Craig |
| 6,444,950 B1 | | 9/2002 | Alkekruse et al. |
| 6,525,297 B2 | | 2/2003 | Doherty |
| 6,649,858 B2 | | 11/2003 | Wakeman |
| 6,710,300 B2 | | 3/2004 | Steenis et al. |
| 6,744,013 B2 | | 6/2004 | Jones |
| 6,847,009 B2 | | 1/2005 | Stuart et al. |
| 6,852,950 B2 | | 2/2005 | Giese |
| 6,924,461 B2 | | 8/2005 | Matiash |
| 7,105,775 B2 | | 9/2006 | Giese |
| 7,180,028 B2 | | 2/2007 | Flood et al. |
| 7,309,844 B2 | | 12/2007 | Lojole |
| 7,576,300 B2 | | 8/2009 | Giese |
| 8,338,753 B2 | | 12/2012 | Kachline |
| 2003/0057196 A1 | * | 3/2003 | Jones ..................... B23K 9/295 |
| | | | 219/137.42 |
| 2008/0105668 A1 | | 5/2008 | Giese |
| 2009/0152255 A1 | * | 6/2009 | Ma ......................... B23K 9/295 |
| | | | 219/137.61 |
| 2010/0320184 A1 | | 12/2010 | Enyedy et al. |
| 2011/0062130 A1 | | 3/2011 | Barker et al. |
| 2011/0084053 A1 | | 4/2011 | Doyle et al. |
| 2012/0211479 A1 | | 8/2012 | Anderson |

* cited by examiner

WELDING DIFFUSER INSERT

PRIORITY

The present application is a continuation of U.S. patent application Ser. No. 13/832,212, filed on Mar. 15, 2013, which is incorporated herein by reference in its entirety.

CROSS-REFERENCE TO RELATED APPLICATIONS

The present application is being filed concurrent with an application entitled WELDING DIFFUSER INSERT, which is also a continuation of the above referenced priority application.

FIELD OF THE INVENTION

The present application relates generally to the field of gas metal arc welding (GMAW) or metal inert gas (MIG) welding, and more particularly, to a diffuser and contact tip assembly for use in such welding.

BACKGROUND OF THE INVENTION

A GMAW or MIG welding torch allows a user or robot to direct an electrode metal wire and welding current toward a target work piece. The electrode metal wire is continuously fed from a spool and consumed as the welding process progresses. Components of a GMAW or MIG welding torch include consumables such as a contact tip, a nozzle, and a diffuser. The electrode metal wire feeds through a passageway in the contact tip. The welding current flows through the diffuser and the contact tip. The inert gas flows from passages in the diffuser, and the nozzle guides the gas towards the tip of the electrode metal wire

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a welding diffuser and contact tip assembly is provided for use with a welding apparatus. The assembly comprises a diffuser comprising an interior chamber configured to receive a wire conduit that supplies electrode wire and a shielding gas used during a welding operation. A plurality of openings define exit passages for said shielding gas from the interior chamber to an exterior of the diffuser. A contact tip is coupled to the diffuser and is configured to receive electrode wire, comprising a front portion, a rear portion, and a contact tip bore extending between the front portion and rear portion. A diffuser insert is disposed within the interior chamber of the diffuser, comprising an insert bore extending therethrough configured to receive electrode wire. An outer periphery has at least one surface feature configured to manipulate a flow of said shielding gas from within the interior chamber of the diffuser and out of said exit passages to thereby direct said flow of shielding gas about a molten welding puddle formed during a welding operation.

In accordance with another aspect of the present invention, a welding diffuser and contact tip assembly is provided for use with a welding apparatus. The assembly comprises a diffuser comprising an interior chamber configured to receive a wire conduit that supplies electrode wire and a shielding gas used during a welding operation. A plurality of openings define exit passages for said shielding gas from the interior chamber to an exterior of the diffuser. A contact tip is coupled to the diffuser and is configured to receive electrode wire, comprising a front portion, a rear portion, and a contact tip bore extending between the front portion and rear portion. A diffuser insert is disposed within the interior chamber of the diffuser and is arranged in an abutting relation with the rear portion of the contact tip and an end of the wire conduit, comprising an insert bore configured to receive electrode wire. The insert bore is substantially coaxial with the contact tip bore, and has an outer periphery with a plurality of surface features configured to manipulate a flow of said shielding gas from within the interior chamber of the diffuser and out of said exit passages.

In accordance with another aspect of the present invention, a diffuser insert is provided for use with a welding diffuser and contact tip assembly comprising a diffuser with an interior chamber configured to receive a wire conduit that supplies electrode wire and a shielding gas used during a welding operation, a plurality of openings defining exit passages for said shielding gas from the interior chamber to an exterior of the diffuser, and a contact tip coupled to the diffuser and configured to receive electrode wire. The diffuser insert comprises a diffuser insert body configured to be disposed within the interior chamber of the diffuser, comprising an insert bore extending therethrough configured to receive electrode wire. An outer periphery of the diffuser insert has a plurality of surface features configured to manipulate a flow of said shielding gas from within said interior chamber of the diffuser and out of said exit passages to thereby direct said flow of shielding gas about a molten welding puddle formed during a welding operation.

In accordance with another aspect of the present invention, a welding diffuser and contact tip assembly for use with a welding apparatus is provided. The assembly includes a diffuser comprising an interior chamber configured to receive a wire conduit that supplies electrode wire and a shielding gas used during a welding operation, and a plurality of openings defining exit passages for said shielding gas from the interior chamber to an exterior of the diffuser. The plurality of openings have an elongated shape that extends in a longitudinal direction of the diffuser, and wherein at least one of the openings further comprises an end arranged at an angle with respect to a longitudinal axis of the diffuser. A contact tip is coupled to the diffuser and is configured to receive electrode wire, and comprises a front portion, a rear portion, and a contact tip bore extending between the front portion and rear portion. The plurality of openings are configured to manipulate a flow of said shielding gas from within the interior chamber of the diffuser and out of said exit passages to thereby direct said flow of shielding gas about a molten welding puddle formed during a welding operation.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Figure 1:
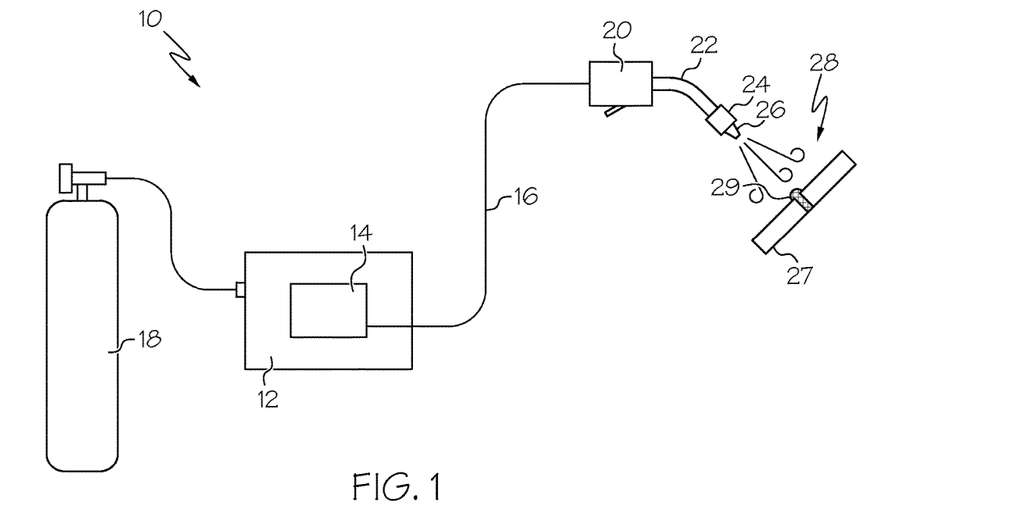
FIG. 1 illustrates a schematic view of one example GMAW or MIG welding torch.

Turning to FIG. 1, an example GMAW or MIG welding apparatus 10, such as a welding torch, is illustrated schematically. The welding apparatus 10 generally includes a wire feeder 12 with a source 14 of suitable electrode wire (such as aluminum wire, steel wire, stainless steel wire, etc.) that is transported via a guide hose 16 to a welding gun 20 (such as a semi-automatic welding gun, a "push-pull" gun with a motor to aid in wire feeding, or even a robotic welding gun, with or without motor). Typically, in electric arc welders, a power source passes current between an electrode and a work piece. Often, the electrode is a continuous welding wire drawn from a supply of welding wire, such as a drum or reel, which is passed through a contact tip 26 or gun on its way to being melted and deposited onto the work piece. The gun 20 can be provided with a selectively operable switch for applying welding power from the power source to the electrode (i.e., the wire) for establishing an arc between an exposed portion of the electrode and the work piece. Wire feeders 12 are often used to advance the welding wire, preferably in a consistent and controllable manner, to the welding gun for use in the welding operation. Welding wire feeders can be manufactured in several forms, each optimized for a specific application. Common classifications of wire feeders include robotic wire feeders, portable wire feeders, tractor wire feeders and bench mount wire feeders.

In one conventional welding arrangement, a portable wire feeder 12 is connected to a remotely positioned power source through a power source cable, also known as an electrode cable or wire. The wire feeder 12 is additionally connected to a welding gun by a guide hose. A motorized feeding system in the wire feeder employs rollers to advance or pay welding electrode wire from a source 14 or supply of wire (often a spool of wire) through the guide hose 16 to the welding gun 20. For this purpose, the guide hose 16 can include an internal tube for transporting the wire from the feeder 12 to the gun 20, in addition to electrical wiring for providing power (such as control circuitry) to the gun 20. Optionally, the guide hose 16 can further include passageways for transporting shielding gas to the gun and/or for circulating cooling fluid through or to the gun. A source of gas 18, which is an inert gas used as the shielding gas during a welding operation, is provided to the wire feeder 12 and is also supplied to the welding gun 20 via the guide hose 16.

The welding gun 20 is handled by a user or a robotic arm to conduct the welding operation, and generally includes a gooseneck 22 that is removably or non-removably coupled to a welding diffuser and contact tip assembly 23. The assembly 23 includes a welding diffuser 24, typically made of brass, coupled to the gooseneck 22, and a contact tip 26, typically made of copper, removably coupled to the welding diffuser 24. While the gooseneck 22 is often removable from the diffuser 24, it is contemplated that the gooseneck 22 and diffuser 24 could be machined as a single part, or even secured together (e.g., brazed together). The welding diffuser 24 is configured to supply the inert gas used as a shielding gas 28 during a welding operation, such as a carbon dioxide and argon blend, although various gasses can be used. The contact tip 26 guides the electrode wire towards the work piece 27 to be welded, and a power lead (not shown) is attached to contact tip 26 to direct the voltage and current between advancing electrode wire and work piece 27 to create the arc for the welding operation. Typically, a molten welding puddle 29 is formed on the work piece 27 during the welding operation.

Figure 2:
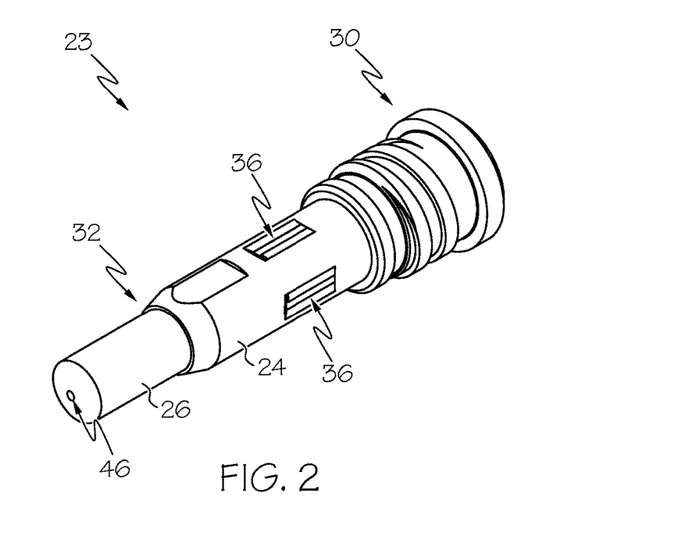
FIG. 2 illustrates a perspective view of a first example welding diffuser and contact tip assembly.
Figure 3:
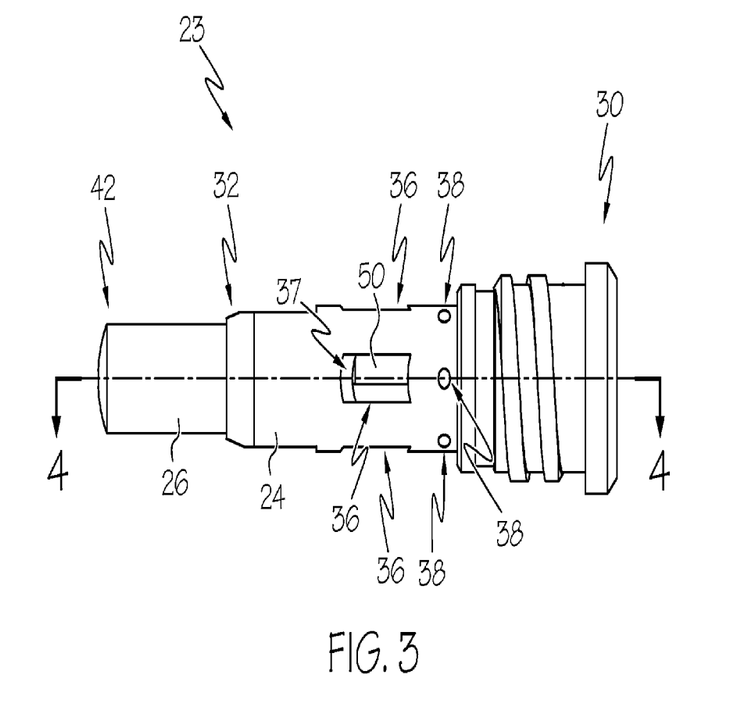
FIG. 3 illustrates a side view of the welding diffuser and contact tip assembly of FIG. 2.
Figure 4:
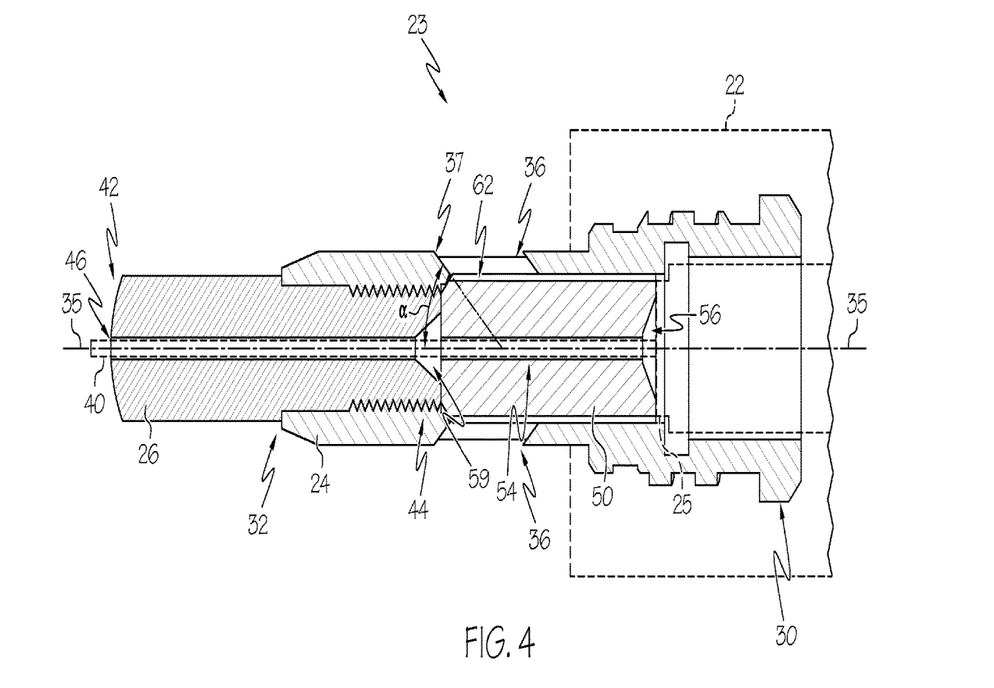
FIG. 4 illustrates a section view of the welding diffuser and contact tip assembly taken along line 4-4 of FIG. 3.

Turning now to FIGS. 2-4, the welding diffuser and contact tip assembly 23 will be described in further detail. The welding diffuser 24 includes a first end 30 configured to be removably coupled to the gooseneck 22 (shown in phantom) of the welding gun 20, such as by a threaded connection or other removable mechanical fastener. The welding diffuser 24 further includes a second end 32 configured to be removably coupled to the contact tip 26 (see FIG. 4), such as by a threaded connection or other removable mechanical fastener. The first and second ends 30, 32 are located opposite from each other along a longitudinal axis 35.

The welding diffuser 24 also includes an interior chamber 34 that at least partially receives an end of the gooseneck 22 so that the electrode wire 40 and shielding gas 28 can be received therein. The end of the gooseneck 22 presents a wire conduit 25 that extends a distance into the interior chamber 34. A plurality of openings 36 define exit passages from the interior chamber 34 to an exterior of the diffuser 24. In one example, four openings 36 can extend through an outer wall of the diffuser 24 in a generally evenly-spaced arrangement, although more or less numbers of openings 36 can be arranged variously. The exit passages can be utilized as gas passages for the shielding gas 28 used during a welding operation, as will be described herein. Still, it is understood that optional openings 38 (see FIG. 2), such as six openings (or more/less), can also be provided as shielding gas discharge holes from the interior chamber 34.

The contact tip 26 includes a front portion 42 at a distal end for delivering the electrode wire 40 to the work piece, and a rear portion 44 configured to be removably coupled to the second end 32 of the diffuser 24. The front and rear portions 42, 44 are located opposite from each other along a longitudinal axis (which can be substantially coaxial with the longitudinal axis 35 of the diffuser 24). In one embodiment, the rear portion 44 of the contact tip 26 can be coupled to the second end 32 of the diffuser 24 via threaded connection or other removable mechanical fastener. The rear portion 44 can have a relatively smaller diameter than the front portion 42 with a shoulder therebetween, and can be at least partially received within the second end 32 of the diffuser 24. In this embodiment, the shoulder is a substantially flat surface of annular shape configured substantially at a right angle, although in another embodiment the shoulder can be a frusto-conically shaped surface or even may have other shapes.

The contact tip 26 further includes an internal surface defining a contact tip bore 46 extending therethrough configured to receive the electrode wire 40. The contact tip bore 46 may be located substantially at the center of the contact tip 26 along the longitudinal axis through the front and rear portions 42, 44. The contact tip bore 46 may further be arranged along the longitudinal axis 35 of the diffuser 24.

During a welding operation, the electrode wire 40 is fed through the welding diffuser and contact tip assembly 23, between the wire conduit 25 and the distal front portion 42 of the contact tip 26. Due to misalignment, friction, and/or the relatively low column strength of the electrode wire 40, there is the possibility that the electrode wire 40 will have feeding issues in the system. For example, as the electrode wire 40 is fed through the system, misalignment and/or increased friction between various rubbing surfaces can create can cause binding or jamming of the electrode wire 40. Debris, such as shavings, chips and the like, can also be created and can build up in certain areas of the system and cause wire feeding problems.

In order to facilitate feeding of the electrode wire 40 along the wire feed path through the diffuser and contact tip assembly 23, the welding diffuser and contact tip assembly 23 further includes a diffuser insert 50. The diffuser insert 50 comprises a diffuser insert body configured to be disposed within the interior chamber 38 of the diffuser 24 that can generally maintain alignment between the wire conduit 25 and the contact tip bore 46. Preferably, the diffuser insert 50 keeps the wire conduit 25, welding diffuser 24, and contact tip bore 46 substantially coaxial with the electrode wire 40. The diffuser insert 50 is made of various materials and geometries. In one example, the diffuser insert 50 can be a separate element arranged in an abutting relation with the rear portion 44 of the contact tip 26. In a further example, the diffuser insert 50 can be arranged in an abutting relation with the wire conduit 25 of the gooseneck 22. The diffuser insert 50 can be removably or non-removably installed within the diffuser 24. Preferably, the diffuser insert 50 is removably installed within the diffuser 24 so that a single diffuser 24 can be used with different electrode wires 40 having different sizes by replacing the diffuser insert 50 with another to accommodate the different sizes of electrode wire 40. Thus, a standard diffuser 24 and standard contact tip 26 can be used with a plurality of different diffuser inserts 50. In one example, the diffuser insert 50 can be captured between the wire conduit 25 and the rear portion of the contact tip 26, such as in a compression arrangement, and can be maintained in position by the attachment of the gooseneck 22 with the first end 30 of the diffuser 24. In another example, the diffuser insert 50 can be secured to the diffuser within the interior chamber 34, such as by a press fit, threaded connection, set screw, or other mechanical fastening structure. Alternatively, the diffuser insert 50 could be removably coupled to the rear portion 44 of the contact tip 26, or in still another example, could be formed together with the rear portion 44 of the contact tip 26. In yet other examples, the diffuser insert 50 could be removably coupled to the end of the wire conduit 25, or could even be provided together with the wire conduit 25 as a monolithic element, such as being non-removably coupled to or even formed together with the wire conduit 25. In still yet other examples, the diffuser insert 50 could be provided with the diffuser 24 as a monolithic element. For example the diffuser insert 50 could be provided as one or more internal projections or apertures extending into the interior chamber 34 of the diffuser 24. The one or more internal projections or apertures could be formed together with the diffuser 24 as a monolithic element by molding, casting, machining, sintering, etc. Alternatively, the one or more internal projections or apertures could be formed together with the diffuser 24 by way of an independently manufactured insert that is then non-removably secured within the interior chamber 34 of the diffuser 24, such as by welding, adhesives, or the like. While the diffuser insert 50 is generally discussed herein as being a single part, it is contemplated that multiple parts can be used together to effectively provide the diffuser insert 50.

Figure 5:
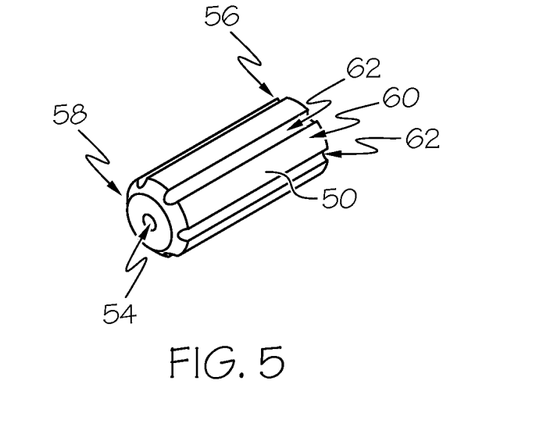
FIG. 5 illustrates a perspective view of one example diffuser insert.
Figure 6:
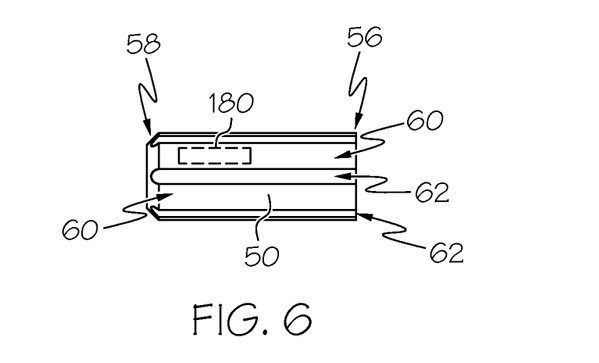
FIG. 6 illustrates a side view of the diffuser insert of FIG. 5.
Figure 7:
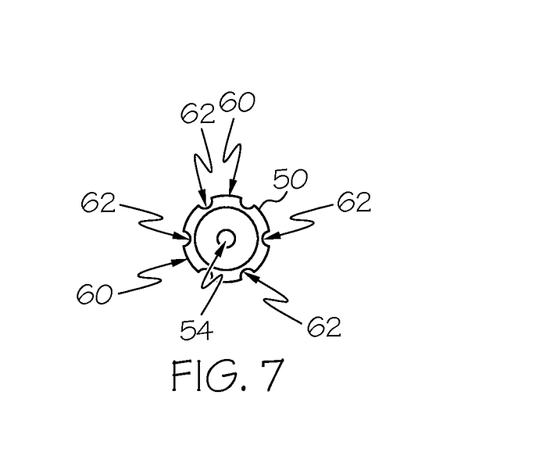
FIG. 7 illustrates a front view of the diffuser insert of FIG. 5.

Turning to FIGS. 5-7, one example diffuser insert 50 is shown that includes an insert bore 54 extending therethrough, between a first end 56 and a second end 58, and is configured to receive the electrode wire 40. The insert bore 54 can be located substantially at a center of the diffuser insert 50, and can be substantially coaxial with the contact tip bore 46. The insert bore 54 can also be substantially coaxial with the wire conduit 25 of the gooseneck 22, such that the electrode wire 40 is substantially concentric with the wire conduit 25, diffuser 24, and contact tip 26 as it moves through the system. In different examples, the electrode wire 40 can be provided with various outer diameters, such as 0.030", 0.035", 3/64", or 1/16", although other sizes can be utilized. The first end 56 of the insert bore 54 has a diameter substantially similar to a diameter of the electrode wire 40 received within the insert bore 54 to accurately guide the electrode wire 40 through the diffuser 24 and reduce the creation of additional debris. By "substantially similar," it is contemplated that the first end 56 of the insert bore 54 can have an inner diameter that provides a relatively tight tolerance, such as approximately 0.010" greater than the diameter of the electrode wire 40 (other tolerances are contemplated). The first end 56 may further include a chamfered or counter-bored geometry to ease the electrode wire 40 into the diffuser insert 50 and reduce the generation of additional debris 52. Additionally, the diffuser insert 50 is preferably made from a material that has less hardness as compared to the material of the electrode wire 40 to inhibit the creation of additional debris (e.g., shavings, chips, etc.) as the electrode wire 40 is fed through the diffuser insert 50. In one example, the diffuser insert 50 can be made from a plastic material, although various other materials of less hardness than the electrode wire 40 are also contemplated. Still, the diffuser insert 50 can be made of relatively harder materials, such as metals or the like. In other examples, either or both of the first end 56 and the electrode wire 40 can include a coating or other covering of a material (e.g., plastic, Teflon, or the like) that has less hardness as compared to the material of the electrode wire 40 to reduce friction and/or inhibit the creation of additional debris. Such a coating or other covering could be beneficial where the diffuser insert 50 is made of a relatively hard material, such as metal (e.g., brass, aluminum, steel, etc.) In yet another alternative, a tube or the like can be provided inside of the contact tip bore 46 to help reduce friction.

A second end 58 of the insert bore 54 is arranged to substantially line up with the contact tip bore 46 so that the electrode wire 40 can easily be fed through the diffuser insert 50 and then through the contact tip 26. For example, the first and second ends 56, 58 of the insert bore 54 and the contact tip bore 46 can all be substantially coaxial. Preferably, the inner diameter of both the first and second ends 56, 58 are substantially similar to help maintain concentricity. Optionally, the cross-sectional area of the second end 58 of the insert bore 54 can be relatively larger than the cross-sectional area of the first end 56, such as with a stepped or even conical geometry, with the relatively larger cross-sectional area adjacent the rear portion 44 of the contact tip 26. Still, it can be beneficial to maintain a relatively constant diameter of the insert bore 54 along its length so as to maintain the concentricity of the wire feed path. In addition or alternatively, the contact tip 26 can further include an increased cross-sectional area 59 of the contact tip bore 46 immediately adjacent the end of the rear portion 44 to facilitate the transfer of electrode wire 40 between the insert bore 54 and the contact tip 26. In one example, the geometry of the contact tip bore 46 immediately adjacent end of the rear portion 44 can be stepped or conical. The increased cross-sectional area 59 of the contact tip bore 46 could be arranged adjacent to an optional enlarged second end 58 of the insert bore 54 such that the two largest cross-sectional areas are immediately adjacent.

In addition to maintaining concentricity of the electrode wire 40 along the wire feed path, the diffuser insert 50 can also be configured to control or manipulate the shielding gas flow condition around the molten puddle of the work piece during a welding operation. For example, different diffuser inserts 50 can have varying geometries that allow the user to manipulate the flow of shielding gas 28 to gain a desired flow around the molten puddle 29. The diffuser insert 50 can include an outer periphery 60 with at least one surface feature configured to manipulate a flow of shielding gas 28 from within the interior chamber 34 of the diffuser 24 and out of said exit passages 36 to thereby direct the flow of shielding gas 28 about the molten welding puddle formed during a welding operation. As shown in FIGS. 3 and 4, the outer periphery 60 of the diffuser insert 50 is at least partially exposed over the linear extent of the exit passages 36, such that the shielding gas 28 flows over and along the outer periphery 60 of the diffuser insert 50 prior to being discharged to an exterior environment. Thus, the flow of shielding gas 28 can be controlled or manipulated in various manners, such as direction, volume or mass flow, velocity, or to be relatively more laminar or more turbulent.

Different surface features of the outer periphery 60 can manipulate the flow of shielding gas 28 in different manners to gain a desired flow around the molten puddle 29. In one example, the diffuser insert 50 can include a plurality of surface features configured to manipulate the flow of shielding gas 28. Any or all of the surface features may be similar to different. For example, as shown in FIGS. 5-7, at least one of the plurality of surface features can include an elongated channel 62, such as a depression, groove, slot, or the like that is recessed a distance below the outer periphery 60. A reverse construction is also contemplated, wherein the surface features extend a distance outwards from a recessed outer periphery to provide gas flow. The diffuser insert 50 can be sized such that the outer periphery 60 has a cross-sectional area or diameter substantially similar (e.g., with a relatively tight tolerance) to an interior cross-sectional area or diameter of the interior chamber 34. Thus, the diffuser insert 50 can generally act as an impediment to gas flow, while the surface features, such as the elongated channel 62, allow the gas to flow through the diffuser 24 and out of the plurality of openings 36. Moreover, a relatively tight tolerance between the diffuser 24 and the diffuser insert 50 can help to maintain concentricity of the wire feed path among the wire conduit 25, diffuser insert 50, and contact tip bore 46.

The surface features can extend various distances along a length of the diffuser insert 50. For example, one or more of the elongated channels 62 can extend along a longitudinal length of the outer periphery 60 of the diffuser insert 50. In one example, a plurality of elongated channels 62 can extend along substantially the entire length of the diffuser insert 50. As shown in FIG. 6, the first end 56 and opposite second end 58 of the diffuser insert 50 define a length therebetween, and the plurality of surface features can extend along substantially the entire length of the diffuser insert 50. Thus, the plurality of elongated channels 62 can be substantially continuous and extend substantially the entire length of the diffuser insert 50 between the first and second ends 56, 58. Still, it is contemplated that either or both of the first and second ends 56, 58 can have various features that may offset the length of the surface features. For example, the second end 58 can include a stepped, tapered, or conical geometry to match the internal geometry of the interior chamber 34 and/or facilitate easy insertion of the diffuser insert 50 into the interior chamber 34 of the diffuser 24. Still, in the shown example of FIG. 6 the elongated channels 62 are considered to extend substantially the entire length of the diffuser insert 50. In addition or alternatively, it is further contemplated that some or all of the plurality of elongated channels 62 can extend less than the entire length of the diffuser insert 50.

Moreover, the elongated channels 62 can have various geometries along their length. In one example, the plurality of elongated channels 62 can be relatively straight and extend along the diffuser insert 50 substantially parallel to the longitudinal axis 35 of the diffuser 24. In other examples, some or all of the elongated channels 62 can be at least partially curved, such as in a spiral or helix, or can even be angled. Additionally, the surface features can be arranged variously about the outer periphery 60 of the diffuser insert 50 to control the gas flow condition. In one example, the plurality of surface features can be arranged generally symmetrically about the outer periphery 60 of the diffuser insert 50. As shown in FIGS. 5-7, six elongated channels 62 are arranged symmetrically about the outer periphery 60. Thus, the shielding gas 28 will flow substantially equally around the diffuser insert 50 and out of the openings 36 of the diffuser 24 to be provided generally symmetrically and equally about the molten puddle 29. The surface features can be provided about the outer periphery 60 in various other arrangements, such as in various patterns, arrays, or even randomly. In addition or alternatively, some or all of the surface features can be interconnected to facilitate gas flow around the diffuser insert 50 and/or provide increased control of the shielding gas 28. As shown in FIGS. 5-7, the surface features are discrete and independent. Still, various interconnecting channels could be provided between the elongated channels 62. In yet another example, the surface features can include discontinuities or even complete separations, so as to alter gas flow therealong.

Together with the diffuser insert 50, the plurality of openings 36 of the diffuser 24 can be configured to control or manipulate the flow of shielding gas 28. For example, the plurality of openings 36 can be provided as a series of milled slots arranged around the circumference of the diffuser 24. The openings 36 can have various geometries, such as square, circular, rectangular, oval, polygonal, etc. In one example, the openings 36 can have an elongated shape that extends in a longitudinal direction, such as substantially parallel to the longitudinal axis 35 of the diffuser 24, to facilitate the discharge of the shielding gas 28. In addition or alternatively, the openings 36 could have a shape that extends in various other directions to control or manipulate the flow of shielding gas 28. The openings 36 could also be arranged at an angle with respect to the longitudinal axis 35 of the diffuser 24, and could even coordinate with the geometry or angles of associated surface features of the diffuser insert 50. The internal geometry of the slotted openings 36 can also be configured control or manipulate the flow of shielding gas 28 around the molten puddle 29. As shown in FIG. 4, at least one of the exit passages 36 can be arranged at an angle α with respect to portions of the diffuser 24, such as the longitudinal axis 35. For example, one or more ends 37 of the opening 36 can be provided at the angle α. It is contemplated that some or all of the exit passages 36 can be arranged at a similar angle α. Various angles are contemplated, such as approximately 40 degrees relative to the longitudinal axis 35, although the angle can be greater or lesser. Any or all surfaces of the slotted openings 36 can be angled, and the angle(s) can be the same or different. The angle α of the exit passages 36 can be adjusted based on a desired flow direction of the shielding gas, such as to direct, increase, or decrease the flow of shielding gas 28 towards different portions of the welding work piece. It is contemplated that the plurality of openings 36 can be configured to manipulate a flow of the shielding gas 28 from within the interior chamber 34 of the diffuser 24 and out of the exit passages 36 to thereby direct the flow of shielding gas about a molten welding puddle 29 formed during a welding operation. Additionally, the diffuser insert 50 can be configured to further manipulate the flow of the shielding gas 28 through the exit passages 36. Thus, the plurality of openings can be used with or without the diffuser insert 50. For example, a combination of the geometry of the diffuser insert 50 together with the exit passages 36 can control or manipulate the desired flow direction or flow rate of the shielding gas 28.

Figure 8:
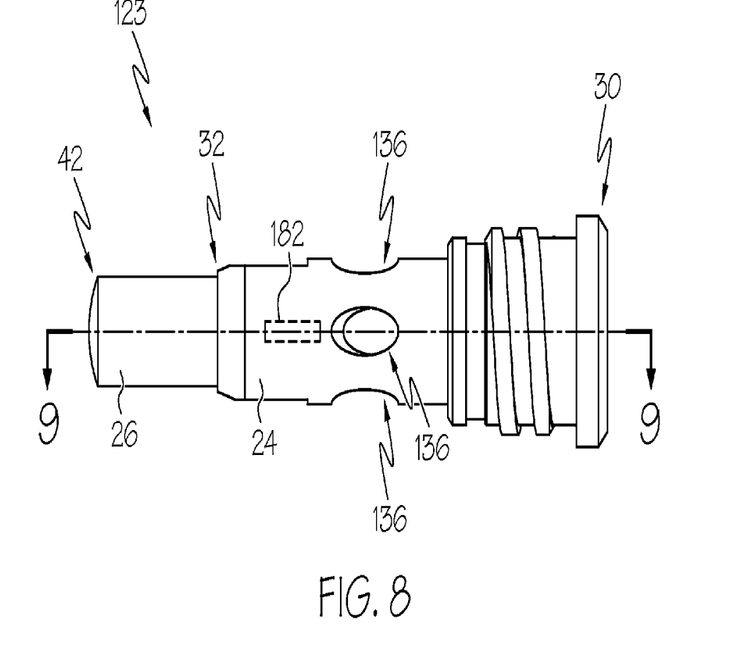
FIG. 8 illustrates a side view of a second example welding diffuser and contact tip assembly.
Figure 9:
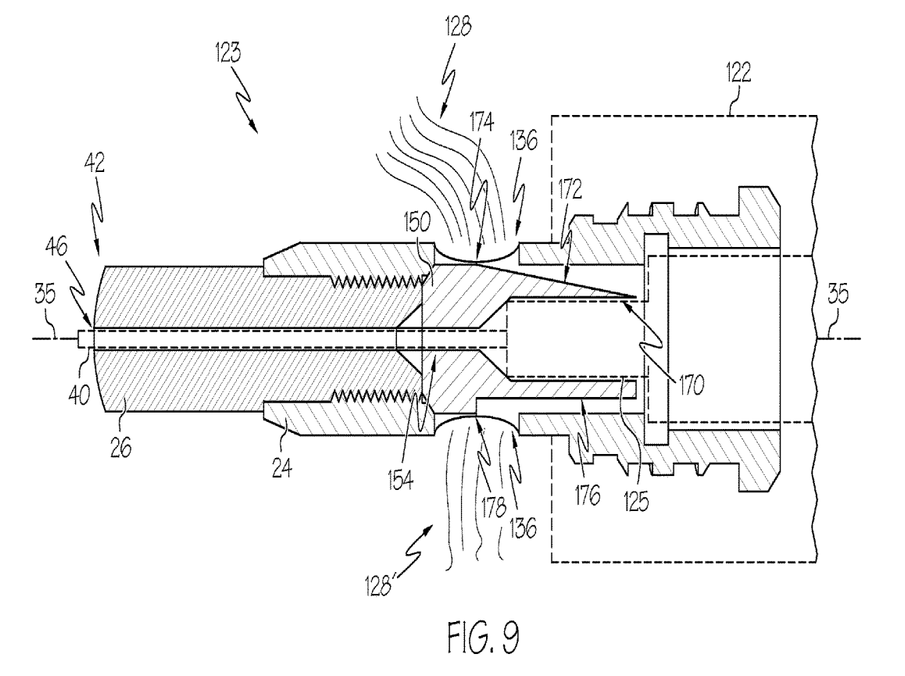
FIG. 9 illustrates a section view of the welding diffuser and contact tip assembly taken along line 9-9 of FIG. 8.

Turning now to FIGS. 8-9, a second example welding diffuser and contact tip assembly 123 is illustrated with another example diffuser insert 150. It is understood that any of the features previously discussed herein can apply similarly to the embodiment shown in FIGS. 8-9. For clarity, similar or identical parts are illustrated with the same reference numbers as in the previous figures. However, new or different parts are illustrated using a "100"-series reference number.

The second example diffuser insert 150 can include varying geometries that allow the user to manipulate the flow of shielding gas 128, 128' to gain a desired flow around the molten puddle 29. For example, the diffuser insert 150 can include an outer periphery with at least one surface feature configured to manipulate a flow of shielding gas 128, 128' from within the interior chamber 34 of the diffuser 24 and out of said exit passages 136 to thereby direct the flow of shielding gas 128 about a molten welding puddle formed during a welding operation. The outer periphery of the diffuser insert 150 is at least partially exposed over the linear extent of the exit passages 136, such that the shielding gas 128, 128' flows over and along the outer periphery of the diffuser insert 150 prior to being discharged to an exterior environment. Optionally, the diffuser insert 150 can include a recess 170, which can be generally concentric with the insert bore 154, configured to receive a corresponding portion of the wire conduit 25. The recess 170 can facilitate alignment of the wire conduit 25 and electrode wire 40 to thereby help maintain concentricity of the wire feed path. The interaction of the recess 170 and wire conduit 25 can further help to capture and retain the insert bore 154 within the interior chamber 34. The recess 170 may further include a tapered geometry leading into the insert bore 154 to reduce friction on the electrode wire 40.

Different surface features of the outer periphery can manipulate the flow of shielding gas 128, 128' in different manners to gain a desired flow around the molten puddle 29. Two example surface features 172, 176 are illustrated in FIG. 9, together with two associated gas flows of shielding gas 128, 128' (respectively) for comparison, although it is understood that any or all of the surface features may be similar to different as desired to manipulate the gas flow. The diffuser insert 150 can be sized such that the outer periphery has a cross-sectional area or diameter substantially similar to an interior cross-sectional area or diameter of the interior chamber 34. Thus, the diffuser insert 150 can generally act as an impediment to gas flow, while the surface features 172, 176 allow the gas to flow through the diffuser 24 and out of the plurality of exit passages 136.

In one example, at least one (or even all) of the plurality of surface features 172 can include a tapered geometry arranged at an angle relative to a longitudinal axis 35 of the diffuser 24. The tapered geometry of the surface feature 172 can help to control or manipulate the flow of shielding gas 128 out of the corresponding exit passage 136 to achieve a desired gas flow condition. For example, the shielding gas 128 is illustrated as having an angled flow pattern directed generally towards the end of the contact tip 26, although at an angle away from the longitudinal axis 35. Such a configuration could provide relatively more shielding gas 128 towards the work piece 27 and molten puddle 29. It is further contemplated that the tapered geometry of the surface feature 172 can be configured together to work with, such as complement, the geometry of the exit passages 136. In one example, the tapered geometry of the surface feature 172 can be configured to substantially match the angle α of at least one exit passage 136. Thus, for example, if the angle α of at least one exit passage 136 is about 40 degrees, the angle of the tapered geometry of the surface feature 172 can similarly be about 40 degrees. If all of the slotted openings 36 are angled at approximately the same angle α, then it is contemplated that the entire outer periphery of the diffuser insert 150 can have substantially matching angled surface features 172, and could even present the outer periphery as a substantially conical geometry.

In another example, at least one (or even all) of the plurality of surface features 176 can include a tapered or non-tapered geometry with an end 178 having geometry configured to control or manipulate the gas flow. For example, the end 178 of the surface feature 176 can have a relatively abrupt geometry that could adjust or angle the flow pattern to be directed generally outwards and perpendicular with respect to the contact tip 26. Such a configuration could provide relatively less shielding gas 128' towards the work piece 27 and molten puddle 29. In an alternative example, the end 178 could even be angled to redirect the shielding gas 128' away from the work piece 27 and molten puddle 29 and/or the user. The ends 174, 178 of the surface features 172, 176 can work together with the geometry of the ends 137 of the exit passages 136, as previously discussed herein.

The surface features 172, 176 can extend various distances along a length of the diffuser insert 150. For example, the surface features 172, 176 can extend along a longitudinal length of the outer periphery of the diffuser insert 150. Different termination positions of the surface features 172, 176 can also control or manipulate the flow of shielding gas 128, 128'. In one example, the tapered geometry of surface feature 172 can extend partially along the length of the diffuser insert 150 such than an end 174 terminates at a position along the exit passage 136, such as towards a middle or end of the exit passage 136. The length that the surface feature 172 extends along the exit passage 136 can also be used to throttle or adjust the gas flow rate, by covering or revealing various amounts of the cross-sectional area of the exit passage 136. In another example, the abrupt geometry of the end 178 can terminate at various positions along the exit passage 136, such as towards a middle or end. In still another example, either of the surface features 172, 176 could extend along substantially an entire length of the diffuser insert 150, and could even be substantially continuous along the entire length of the diffuser insert 150.

In addition or alternatively, any or all of the surface features of the diffuser insert 50, 150 can be similar or different. If all or most of the surface features are similar, a relatively more homogeneous or symmetrical flow of shielding gas can be provided around the diffuser and contact tip assembly 23, 123 and molten puddle 29. However, due to various welding conditions and work piece locations, it may be desired to provide an asymmetrical shielding gas flow. For example, when conducting a welding operation in a restricted environment, such as in a corner, it may be desired to provide relatively less gas flow towards the corner side of the weld, and relatively more gas flow towards the open (non-corner) side of the weld. Thus, at least one surface feature of the outer periphery of the diffuser insert 50, 150 can be configured to manipulate the flow of shielding gas to be asymmetrical about the molten welding puddle 29 formed during a welding operation. For example, the diffuser and contact tip assembly 123 shown in FIG. 9 illustrates two different and asymmetrical flows of shielding gas 128, 128' that are provided by a diffuser insert 150 having two or more different surface features 172, 176.

In addition or alternatively, the diffuser 24 and/or the diffuser insert 50, 150 can include alignment indicia 180, 182 (see FIGS. 6 & 8) to help a user to align the different surface features with the desired exit passages so that an expected gas flow condition is achieved. Different indicia can be provided for any or all of the different surface features and/or different exit holes. Various types of indicia 180, 182 can be used, such as printed, etched, stamped, etc. The indicia 180, 182 can be raised or recessed. The indicia 182, 182 can be visible in various manners and locations to the user, such as inside or outside the assembly 123, and may even be visible through one or more exit passages 136. In yet another example, the indicia 180, 182 could include mating keyed structure for mechanical alignment, such as between an interior wall of the diffuser 24 and on the outer periphery of the diffuser insert 50, 150.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A diffuser assembly for a welding torch; said diffuser assembly comprising:
    a diffuser body having a first end and a second end positioned opposite said first end, said diffuser body having a longitudinal axis extending from said first end to said second end;
    an interior chamber positioned between said first end and said second end, where said interior chamber is open at said first end to permit a flow of a gas into said interior chamber from said first end and where said interior chamber is defined by a wall portion of said diffuser body;
    a plurality of openings in said wall portion of said interior chamber where said plurality of openings pass through said wall portion to permit said flow of said gas to exit said interior chamber through said plurality of openings; and
    a diffuser insert positioned within said interior chamber, where said diffuser insert seats within said interior chamber and where said diffuser insert is exposed to an outside of said diffuser body through said plurality of openings;
    wherein said diffuser insert has an upstream cavity portion and a downstream bore portion, each of which are co-axial with said longitudinal axis, where said upstream cavity portion has a larger diameter than said downstream bore portion and said diffuser insert is oriented such that said upstream cavity portion is open to said first end of said diffuser body, and where said downstream bore portion extends from said upstream cavity portion to a downstream end face of said diffuser insert;
    wherein said diffuser insert has at least one flow feature on a sidewall of said diffuser insert which manipulates said flow of said gas to direct said flow of said gas from said interior chamber to said plurality of said openings; and
    wherein at least a portion of said diffuser insert along a longitudinal position of said diffuser insert overlaps with said openings along an entire longitudinal length of said openings, when viewed from a radial direction with respect to said diffuser body.

2. The diffuser assembly of claim 1, wherein said diffuser insert is removable from said diffuser body.

3. The diffuser assembly of claim 1, wherein said downstream bore portion has a chamfered opening on an upstream end of said downstream bore portion.

4. The diffuser assembly of claim 1, wherein said plurality of said openings are evenly distributed radially on said wall portion.

5. The diffuser assembly of claim 1, wherein said diffuser insert has a plurality of said features on said sidewall manipulate said flow of said gas.

6. The diffuser assembly of claim 1, wherein said at least one feature is positioned along a longitudinal length of said diffuser insert to coincide with a longitudinal position of said openings.

7. The diffuser assembly of claim 1, wherein said at least one feature is a protrusion from said sidewall.

8. The diffuser assembly of claim 1, wherein said diffuser insert has a contact tip contact surface on a downstream end of said diffuser insert, where said diffuser insert is positioned within said diffuser body such that said contact tip contact surface contacts with a contact tip when assembled into a welding torch.

9. The diffuser assembly of claim 1, wherein said diffuser insert comprises an axially extending feature which contacts an inner surface of said interior chamber, where said axially extending feature further affects a flow of said gas to direct said flow of said gas to said plurality of said openings.

10. The diffuser assembly of claim 5, wherein said plurality of features are arranged symmetrically around a periphery of said sidewall of said diffuser insert.

11. A diffuser assembly for a welding torch; said diffuser assembly comprising:
a diffuser body having a first end and a second end positioned opposite said first end, said diffuser body having a longitudinal axis extending from said first end to said second end;
an interior chamber positioned between said first end and said second end, where said interior chamber is open at said first end to permit a flow of a gas into said interior chamber from said first end, where said interior chamber is open at said second end to permit insert of a contact tip, and where said diffuser body has a wall portion between said first and second ends;
a plurality of openings in said wall portion which are symmetrically distributed, where said plurality of openings pass through said wall portion to permit said flow of said gas to exit said diffuser body through said plurality of openings; and
a diffuser insert positioned within said interior chamber, where said diffuser insert seats within said interior chamber and where said diffuser insert is exposed to an outside of said diffuser body through said plurality of openings, where said diffuser insert along a longitudinal position of said diffuser insert overlaps with said openings along an entire longitudinal length of said openings, when viewed from a radial direction with respect to said diffuser body;
wherein said diffuser insert has an upstream cavity portion and a downstream bore portion, each of which are co-axial with said longitudinal axis, where said upstream cavity portion has a larger diameter than said downstream bore portion and said diffuser insert is oriented such that said upstream cavity portion is open to said first end of said diffuser body, and where said downstream bore portion extends from said upstream cavity portion to a downstream end face of said diffuser insert;
wherein said diffuser insert has a plurality of flow features on a sidewall of said diffuser insert which manipulate said flow of said gas to direct said flow of said gas from said interior chamber to said plurality of said openings, and
wherein said diffuser insert is removable and secured in a press-fit relationship with said diffuser body.

12. The diffuser assembly of claim 11, wherein said downstream bore portion has a chamfered opening on an upstream end of said downstream bore portion.

13. The diffuser assembly of claim 11, wherein said plurality of features are positioned along a longitudinal length of said diffuser insert to coincide with a longitudinal position of said openings.

14. The diffuser assembly of claim 11, wherein at least one of said plurality of features are protrusions from said sidewall.

15. The diffuser assembly of claim 11, wherein said diffuser insert has a contact tip contact surface on a downstream end of said diffuser insert, where said diffuser insert is positioned within said diffuser body such that said contact tip contact surface contacts with a contact tip when assembled into a welding torch.

16. The diffuser assembly of claim 11, wherein said diffuser insert comprises an axially extending feature which contacts an inner surface of said interior chamber, where said axially extending feature further affects a flow of said gas to direct said flow of said gas to said plurality of said openings.

17. A diffuser assembly for a welding torch; said diffuser assembly comprising:
a diffuser body having a first end and a second end positioned opposite said first end, said diffuser body having a longitudinal axis extending from said first end to said second end;
an interior chamber positioned between said first end and said second end, where said interior chamber is open at said first end to permit a flow of a gas into said interior chamber from said first end, where said interior chamber is open at said second end to permit insert of a contact tip, and where said diffuser body has a wall portion between said first and second ends;
a plurality of openings in said wall portion which are symmetrically distributed, where said plurality of openings pass through said wall portion to permit said flow of said gas to exit said diffuser body through said plurality of openings; and
a diffuser insert positioned within said interior chamber, where said diffuser insert seats within said interior chamber and where said diffuser insert is exposed to an outside of said diffuser body through said plurality of openings, where said diffuser insert along a longitudinal position of said diffuser insert overlaps with said openings along an entire longitudinal length of said openings, when viewed from a radial direction with respect to said diffuser body;
wherein said diffuser insert has an upstream cavity portion and a downstream bore portion, each of which are co-axial with said longitudinal axis, where said upstream cavity portion has a larger diameter than said downstream bore portion and said diffuser insert is oriented such that said upstream cavity portion is open to said first end of said diffuser body, and where said downstream bore portion extends from said upstream cavity portion to a downstream end face of said diffuser insert;
wherein an outer surface of said diffuser insert has an axially extending feature to provide said flow of said gas to said plurality of said openings, and
wherein said diffuser insert is secured in a press-fit relationship with said diffuser body.

18. The diffuser assembly of claim 17, wherein said diffuser insert further comprises a plurality of flow features on said outer surface said diffuser insert which directs said flow of said gas in said interior chamber to said axially extending feature.

19. A diffuser assembly for a welding torch; said diffuser assembly comprising:
a diffuser body having a first end and a second end positioned opposite said first end, said diffuser body having a longitudinal axis extending from said first end to said second end;
an interior chamber positioned between said first end and said second end, where said interior chamber is open at said first end to permit a flow of a gas into said interior chamber from said first end and where said interior chamber is defined by a wall portion of said diffuser body;

a plurality of openings in said wall portion of said interior chamber where said plurality of openings pass through said wall portion to permit said flow of said gas to exit said interior chamber through said plurality of openings; and
a diffuser insert positioned entirely within said interior chamber, where said diffuser insert seats within said interior chamber and where said diffuser insert is exposed to an outside of said diffuser body through said plurality of openings;
wherein said diffuser insert has an upstream cavity portion and a downstream bore portion, each of which are co-axial with said longitudinal axis, where said upstream cavity portion has a larger diameter than said downstream bore portion and said diffuser insert is oriented such that said upstream cavity portion is open to said first end of said diffuser body, and where said downstream bore portion extends from said upstream cavity portion to a downstream end face of said diffuser insert;
wherein said diffuser insert has at least one flow feature on a sidewall of said diffuser insert that is at least one of a depression, groove and slot to manipulate said flow of said gas to direct said flow of said gas from said interior chamber to said plurality of said openings; and
wherein at least a portion of said diffuser insert along a longitudinal position of said diffuser insert overlaps with said openings along an entire longitudinal length of said openings, when viewed from a radial direction with respect to said diffuser body.

\* \* \* \* \*